United States Patent
Toskala et al.

(10) Patent No.: US 6,374,118 B1
(45) Date of Patent: Apr. 16, 2002

(54) METHOD OF PHYSICAL RADIO CHANNEL POWER CONTROL

(75) Inventors: Antti Toskala, Helsinki; Harri Holma, Espoo, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/669,873

(22) Filed: Sep. 25, 2000

Related U.S. Application Data (63) Continuation of application No. PCT/FI99/00252, filed on Mar. 26, 1999.

(30) Foreign Application Priority Data

Mar. 27, 1998 (FI) .................................................. 980702

(51) Int. Cl.⁷ .................................................. H04B 7/00
(52) U.S. Cl. ....................... 455/522; 455/67.3; 370/342
(58) Field of Search ................................ 455/422, 522, 455/68, 69, 67.1, 67.3, 63, 62; 370/310, 311, 318, 320, 328, 342, 441, 522

(56) References Cited

U.S. PATENT DOCUMENTS 6,101,179 A * 8/2000 Soliman ..................... 455/522
6,175,586 B1 * 1/2001 Lomp ......................... 455/522

FOREIGN PATENT DOCUMENTS

| EP | 0790713 | 8/1997 |
| EP | 0809365 | 11/1997 |
| EP | 0843421 | 5/1998 |
| WO | WO 98/36606 | 8/1998 |

OTHER PUBLICATIONS

"Concept Group Alpha—Wideband Direct Sequence CDMA (WCDMA). Evaluation Document (3.0) Part 1: System Description Performance Evaluation", ETSI SMG, Meeting No. 24, Madrid, Spain, Dec. 15–19, 1997.

* cited by examiner

Primary Examiner—Thanh Cong Le
(74) Attorney, Agent, or Firm—Altera Law Group, LLC (57) ABSTRACT

The invention relates to a method of physical channel power control in a radio system and to a radio system. The method comprises (458) establishing a physical channel with at least one spreading code, (452) placing at least one service in the physical channel, and (464) performing physical channel power control according to the carrier/interference target set for the physical channel. According to the invention one service is (460) selected from among the active services placed in the physical channel, and the carrier/interference target of the one selected service is (462) set to lead physical channel power control.

34 Claims, 5 Drawing Sheets

METHOD OF PHYSICAL RADIO CHANNEL POWER CONTROL

This application is a continuation of PCT/FI99/00252, Mar. 26, 1999.

FIELD OF THE INVENTION

The invention relates to a method of physical channel power control in a radio system, the method comprising: establishing a physical channel with at least one spreading code; placing at least one service in the physical channel; performing physical channel power control according to the carrier/interference target set for the physical channel.

BACKGROUND OF THE INVENTION

According to the prior art power control is performed on a physical channel on the basis of one carrier/interference target defined for it. In the prior art only one kind of service has been transferred on the physical channel at a time. If several different services are transferred simultaneously on the physical channel, e.g. user's speech, moving video images or data, problems arise because power control is not optimized as the channel conditions change. Each service has quality requirements of its own and different channel coding and interleaving solutions. At the beginning of establishment of a radio connection it is difficult to predict which would be a suitable carrier/interference target of power control and how the physical channel should be divided between different services. During the connection transmission power is controlled on the basis of the service which requires the highest transmission power on the physical channel in question. This wastes radio capacity of the system because use of a high transmission power causes interference to other physical radio channels.

When the services use discontinuous transmission, the carrier/interference target of fast power control is maintained the same even though all services would not continuously use the resources of the physical channel. When only one carrier/interference target is defined for a physical channel, controlling of it is a very slow process. The reason for this is that in this case the target is based on a service requiring a very low error ratio, and thus defective frames are relatively infrequent at the receiving end.

In the existing IS-95 system it is not known to transfer parallel services on one physical channel. In the broadband version of the IS-95 system, W-cdmaOne, the problem is solved by using parallel physical channels. Services that require a high transmission rate are transferred on separate additional channels, and a carrier/interference target is defined separately for each of them. The disadvantage of this solution is that power control has to be performed separately on each additional channel, which increases the signalling load.

In conclusion it can be stated that the problem has not occurred earlier, or separate physical channels have been used for solving it, in which case the power of each physical channel can be controlled separately.

BRIEF DESCRIPTION OF THE INVENTION

An object of the invention is to provide a method and an apparatus implementing the method in order to solve the above-mentioned problems. This is achieved with a method described in the preamble, which is characterized by: selecting one service from among the active services placed in the physical channel using a predetermined selection method; setting the carrier/interference target of the one selected service to lead the physical channel power control.

The invention also relates to a radio system comprising: a spreader for establishing a physical channel with at least one spreading code; a multiplexer for placing at least one service in the physical channel; a control arrangement for performing physical channel power control according to a carrier/interference target set for the physical channel.

According to the invention the radio system is characterized in that: the control system selects one service from among the active services placed in the physical channel using a predetermined selection method; the control arrangement sets the carrier/interference target of the one service selected from among the active services to lead the physical channel power control.

Preferred embodiments of the invention are disclosed in independent claims.

The invention is based on the idea that not only one carrier/interference target is rigidly set for the physical channel, but a separate carrier/interference target is set for each service. The service requiring the highest carrier/interference target is selected from among active services, i.e. services causing traffic on the radio path at a given moment, and the carrier/interference target of this service is set to lead power control of the whole physical channel. The method is dynamic, i.e. the carrier/interference target of the physical channel changes according to the services that are activated or inactivated.

The method and system of the invention provide several advantages. Since power control is based on the services transmitted at a given moment and the requirements set by them, power control corresponds to the reality better. In particular, use of too high a transmission power can be avoided, which decreases interference on the radio path and thus increases the amount of radio capacity available in the system. The need for signalling does not increase since power control is performed on one physical channel.

BRIEF DESCRIPTION OF THE DRAWINGS

The invention will be described in greater detail by means of preferred embodiments with reference to the accompanying drawings, in which.

DETAILED DESCRIPTION OF THE INVENTION

Figure 1:
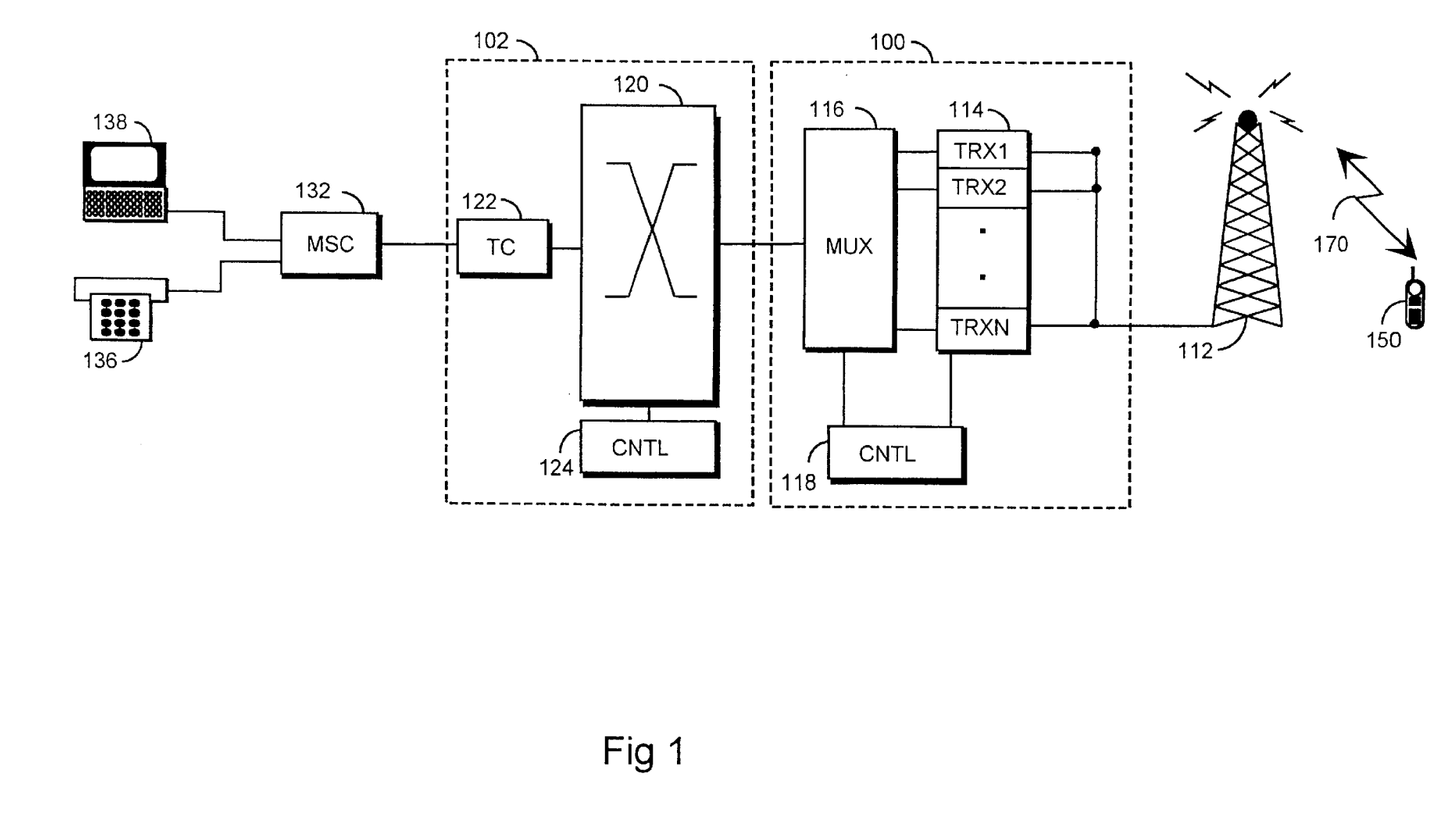
FIG. 1 is a block diagram of the structure of a radio system.

The invention can be used in different radio systems which employ the code division multiple access (CDMA) method. The examples describe use of the invention in a cellular radio network. A typical structure of the cellular radio network is explained with reference to FIG. 1. FIG. 1 includes only blocks relevant to describing the invention, but it is obvious to a person skilled in the art that a conventional cellular radio network also comprises other functions and structures which need not be described in greater detail here. The following could be mentioned as examples of the radio systems according to the invention: European future mobile communication system, i.e. a broadband radio system employing the code division multiple access (WCDMA radio system), UMTS system (Universal Mobile Telephone System) and IMT-2000 system (International Mobile Telephone 2000). The examples are based on the WCDMA system, which is described in greater detail in the ETSI (European Telecommunications Standards Institute) specification "Concept Group Alpha—Wideband Direct Sequence CDMA (WCDMA). Evaluation Document (3.0). Part 1: System Description. Performance Evaluation", which is incorporated herein as reference.

The cellular radio network typically comprises fixed network infrastructure, i.e. a network part, and subscriber terminals 150, which may be fixed, placed in a vehicle or portable. The network part comprises base stations 100. Several base stations 100 are controlled centrally by a base station controller 102 which is in contact with the base stations. The base station controller is also known by the name radio network controller RNC. In addition, the base station 100 comprises transceivers 114.

The base station 100 includes a control unit 118, which controls the function of the transceivers 114 and a multiplexer 116. The multiplexer 116 is used for placing the traffic and control channels used by several transceivers 114 on one transmission connection 160.

There is a connection from the transceivers 114 of the base station 100 to an antenna unit 112 which is used for establishing a bidirectional radio connection 170 to a subscriber terminal 150. The structure of the frames to be transmitted over the bidirectional radio connection 170 is strictly defined, and is called an air interface.

The base station controller 102 comprises a group switching field 120 and a control unit 124. The group switching field 120 is used for connecting speech and data and for connecting signalling circuits. The base station system formed by the base station 100 and the base station controller 102 also comprises a transcoder 122. Distribution of work between the base station controller 102 and the base station 100 as well as their physical structures may vary depending on the embodiment. The base station 100 is typically responsible for establishment of a radio path in the manner described above. The base station controller 102 is typically in charge of the following matters: traffic channel configuration, frequency hopping control, subscriber terminal paging, power control, quality control of active channels and handover control.

The transcoder 122 is usually located as close to a mobile services switching centre 132 as possible because speech can thus be transmitted in the form required by a cellular radio network between the transcoder 122 and the base station controller 102, which allows to save transmission capacity. The transcoder 122 converts the different digital coding formats of speech used between the public switched telephone network and the mobile telephone network into compatible formats, e.g. from the format of the fixed network (64 kbit/s) into a format of the cellular radio network (e.g. 13 kbit/s) and vice versa. The control unit 124 is responsible for call control, mobility management, collection of statistical information and signalling.

According to FIG. 1, a circuit-switched connection can be established from the subscriber terminal 150 to a telephone 136 connected to the public switched telephone network via the mobile services switching centre 132. A packet-switched connection, e.g. a data transmission connection, can also be established to a subscriber terminal 150 from a computer 138 connected to the mobile services switching centre 132 via the public switched telephone network in the manner shown in the figure. The equipment required is not described in greater detail here, but it could be mentioned that no data other than speech is subjected to conversion in the transcoder 122.

Figure 2:
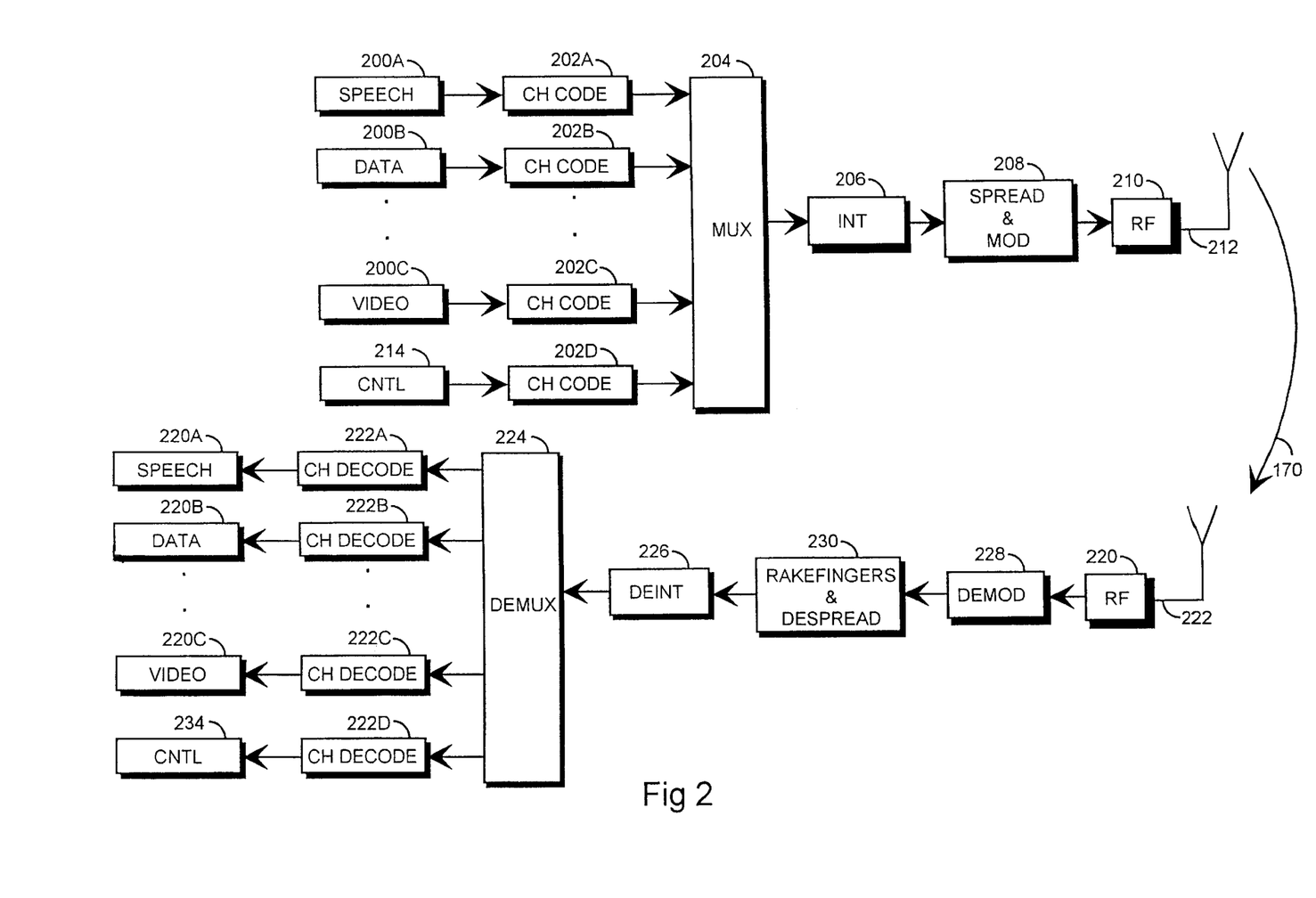
FIG. 2 is a block diagram of the structure of a radio transmitter and radio receiver according to the invention.

FIG. 2 illustrates how the pair of a radio transmitter and a radio receiver functions. FIG. 2 illustrates both the down-link case, in which the radio transmitter is located in the base station 100 and the radio receiver in the subscriber terminal 150, and the up-link case, in which the radio transmitter is located in the subscriber terminal 150 and the radio receiver in the base station 100.

The essential functions of the radio transmitter are described in the upper section of FIG. 2. The different services to be placed in a physical channel include speech 200A, data 200B, moving or still video images 200C and system control channels entering from the control part 214 of the radio transmitter. Different services require different source encoding means, e.g. the speech 200A needs a speech codec. Source encoding means are not, however, shown in FIG. 2 for the sake of clarity.

Different kinds of channel coding is then performed on different services in blocks 202A, 202B, 202C and 202D. Channel coding includes different block codes, e.g. a cyclic redundancy check CRC. Convolutional coding and its variations are typically also used, such as punctured convolutional coding or turbo coding.

After different services have been channel coded, they are time-multiplexed into one physical channel in a multiplexer 204. The structure of the physical channels will be described in greater detail in connection with FIG. 3. Next the time-multiplexed physical channel is interleaved in an interleaver 206. The purpose of interleaving is to facilitate error correction. In interleaving the bits of different services are mixed with one another in a pre-determined manner, and thus a momentarily fade on the radio path does not necessarily render the transferred data unidentifiable.

Then the interleaved information with a relatively narrow band is multiplied by a spreading code with a much broader band, which is usually a pseudo-random noise code. There is a specific spreading code for each connection 170, on the basis of which the receiver identifies transmissions intended for it. Thus each physical channel has a spreading code of its own, but if more capacity is needed, one physical channel can be established using more than one spreading code. Spreading and subsequent modulation are carried out in block 208. In modulation digital signals are modulated for a radio-frequency carrier.

Finally, the modulated signal is supplied to radio frequency parts 210, which may comprise different power amplifiers, filters limiting the band width and a frequency synthesizer. The synthesizer provides different units with the necessary frequencies. The clock included in the synthesizer may be controlled locally, or centrally by another unit, e.g. by the base station controller 102. The synthesizer provides the necessary frequencies e.g. using a voltage-controlled oscillator. The analog radio signal formed is then sent to the radio path 170 via an antenna 212.

The lower section of FIG. 2 illustrates essential functions of the radio receiver. The radio receiver is typically a RAKE receiver. An analog radio-frequency signal is received from the radio path 170 by an antenna 222. The signal is supplied to radio-frequency parts 220, which comprise a filter, which prevents frequencies outside the desired frequency band. After this the signal is converted into an intermediate frequency or directly into the baseband frequency, in which form the signal is sampled and quantisized in an analog/digital converter.

Since the signal is a multipath-propagated signal, signal components that have propagated along different paths are to be combined in block 230, which according to the prior art comprises several RAKE fingers. The signal components received at different delays by the RAKE fingers are searched for by correlating the received signal with the used spreading codes, which have been delayed by predetermined delays. After the delays of the signal components have been found out, the signal components belonging to the same signal are combined. At the same time spreading of the signal components is despread by multiplying the signal by the pseudo-random noise code of the physical channel. The physical channel obtained is deinterleaved in the deinterleaving means 226.

The deinterleaved physical channel is then divided into data flows of different services in a demultiplexer 224. Each service is supplied to a channel decoding block 222A, 222B, 222C, 222D of its own, where the channel coding used in transmission is decoded, e.g. block coding and convolutional coding. Convolutional coding is preferably decoded with a Viterbi decoder. Each transmitted service 220A, 220B, 220C, 220D can thus be supplied to necessary further processing, e.g. the speech 220A is supplied to a speech codec. System control channels are supplied to the control part 234 of the radio receiver.

Figure 3:
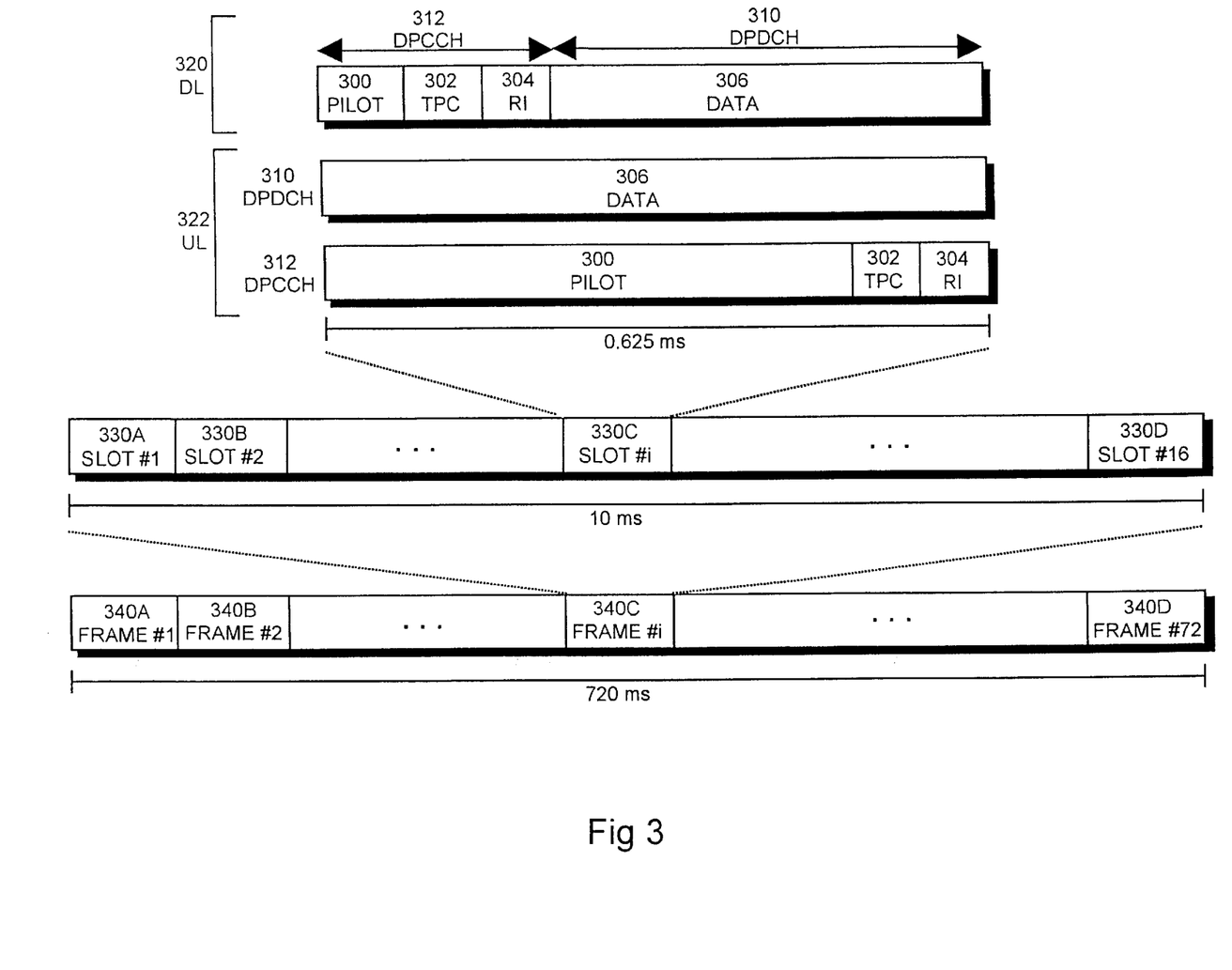
FIG. 3 illustrates a frame structure of a physical channel.

FIG. 3 illustrates an example of a frame structure which can be used on the physical channel. Frames 340A, 340B, 340C, 340D are numbered consecutively from one to seventy-two, and they form a super frame with a length of 720 ms. The length of one frame 340C is 10 ms. The frame 340C is divided into sixteen slots 330A, 330B, 330C, 330D. The length of one slot 330C is 0.625 ms. One slot 330C typically corresponds to one power control period during which power is adjusted one decibel up or down.

Physical channels are divided into two different types: dedicated physical data channels (DPDCH) 310 and dedicated physical control channels (DPCCH) 312. DPD channels 310 are used for carrying data 306 generated in the second layer of the OSI (Open Systems Interconnection) and above it, i.e. dedicated control channels and dedicated traffic channels. DPC channels 312 carry control information generated in the first layer of the OSI. Control information comprises: pilot bits 300 used in channel estimation, transmit power-control commands (TPC) 302 and rate information (RI) 304. The rate information 304 tells the receiver the current transmission rate used for each service multiplexed into the physical channel. Use of rate information is optional because 'blind rate detection' can also be employed, if desired, particularly when there are only a few possible services and rates.

As can be seen in FIG. 3, on the down-link DPD channels 310 and DPC channels 312 are time-multiplexed into the same slot 330C. On the up-link the channels are transmitted parallelly so that they are IQ/code-multiplexed (I=in phase, Q=quadrature) into each frame 340C and transmitted using dual channel quadrature phase-shift keying modulation (QPSK). If additional DPD channels 310 are to be transmitted, they are first code-multiplexed into the I or Q branch of the first channel pair.

Power control is performed both on the up-link and the down-link.

Closed loop power control of the up-link is used for controlling the transmission power of the subscriber terminal 150 so that the carrier/interference of the signal received by the base station 100 remains approximately within the set carrier/interference target. This is carried out according to the prior art, e.g. at a frequency of 1.6 kHz. The invention particularly relates to outer loop control. The outer loop refers in particular to the way in which the carrier/interference target used in closed loop power control is controlled. Outer loop control is performed e.g. at a frequency of 1 to 100 Hz. Closed loop power control and an outer loop are defined correspondingly for the down-link.

The carrier/interference target is also called a SIR target (signal-to-interference ratio), or it could also be defined as $E_s/N_0$, i.e. energy of the channel symbol/noise. The SIR target is defined as decibels, the SIR target of speech being e.g. −4.2 dB and the SIR target of packet data −3.5 dB.

Power control could simply be thought of as a procedure where a carrier/interference target is set at the beginning of a connection. The transmitter is controlled to use transmission power corresponding to the carrier/interference target. The receiver measures a quality attribute for the received data, e.g. a bit error ratio or a frame error ratio. If the measured quality attribute corresponds to the level required from the physical channel, everything is in order and the transmitter may continue transmission with the same power. If the measured quality attribute does not correspond to the required level, the carrier/interference target is increased, and thus the transmission power is also increased, and consequently the quality level required from a physical channel is achieved.

Figure 4A:
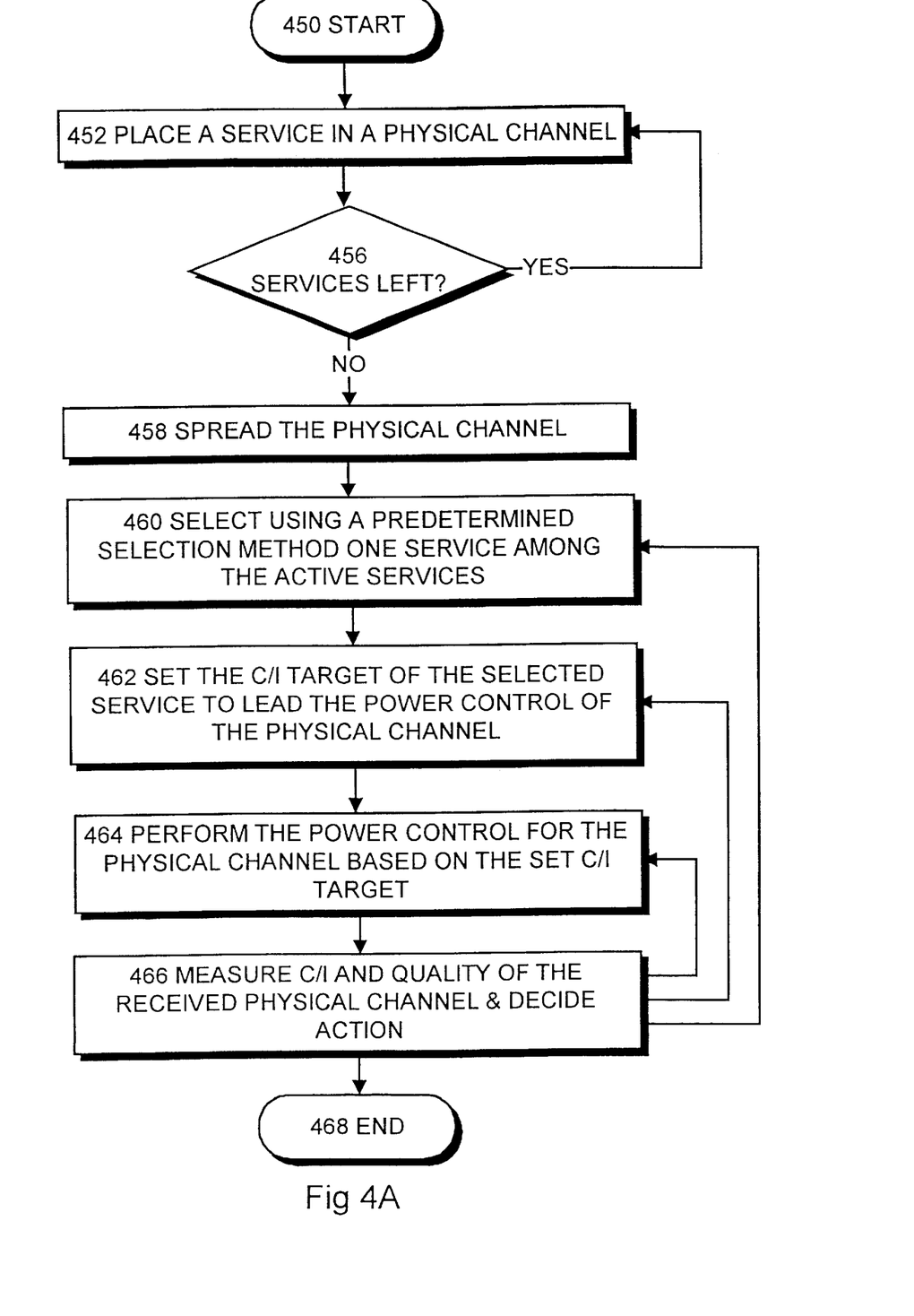
FIGS. 4A and 4B are flow charts of the method of the invention.

FIG. 4A illustrates a basic method of performing physical channel power control in a radio system according to the invention. The method starts in block 450. In block 452 one service is placed in a physical channel. In block 456 it is checked whether there are other services to be placed in the same physical channel. If this is the case, we return to block 452, where the next service is placed in the physical channel. If there are no other services left, we proceed to block 458, where a physical channel is established with at least one spreading code. In block 460 one service is selected from among the active services placed in the physical channel using a predetermined selection method. In block 462 the carrier/interference target of the one selected service is set to lead physical channel power control. In block 464 physical channel power control is performed according to the carrier/interference target set for the physical channel. In block 466 the quality and realized carrier/interference of the received physical channel are measured, and a decision is made on the next action. When the connection terminates, the method is finished in block 468. If the quality of the physical channel was good enough, we return to block 464, where power control can be continued with the same carrier/interference target. If the quality of the physical channel was not good enough, we return to block 462, where the carrier/interference target of the channel is increased. If the quality was too good, the carrier/interference target of the channel can also be calculated in block 462. Furthermore, in block 466 decisions can made on special actions; e.g. if the service that has the highest carrier/interference target is rendered to a discontinuous transmission state, we return to block 460 where the carrier/interference target of the physical channel power control is changed into the carrier/interference target of the service which was placed next to the service leading current power control in the selection method. In practice the power control described in block 464 and control of the carrier/interference target in block 462 are continuous processes performed during the whole connection. Determination of the carrier/interference target described in block 460 is either a continuous process, which can be repeated more than once during the radio connection 170, or a process which is performed once only at the beginning of establishment of the radio connection 170.

Figure 4B:
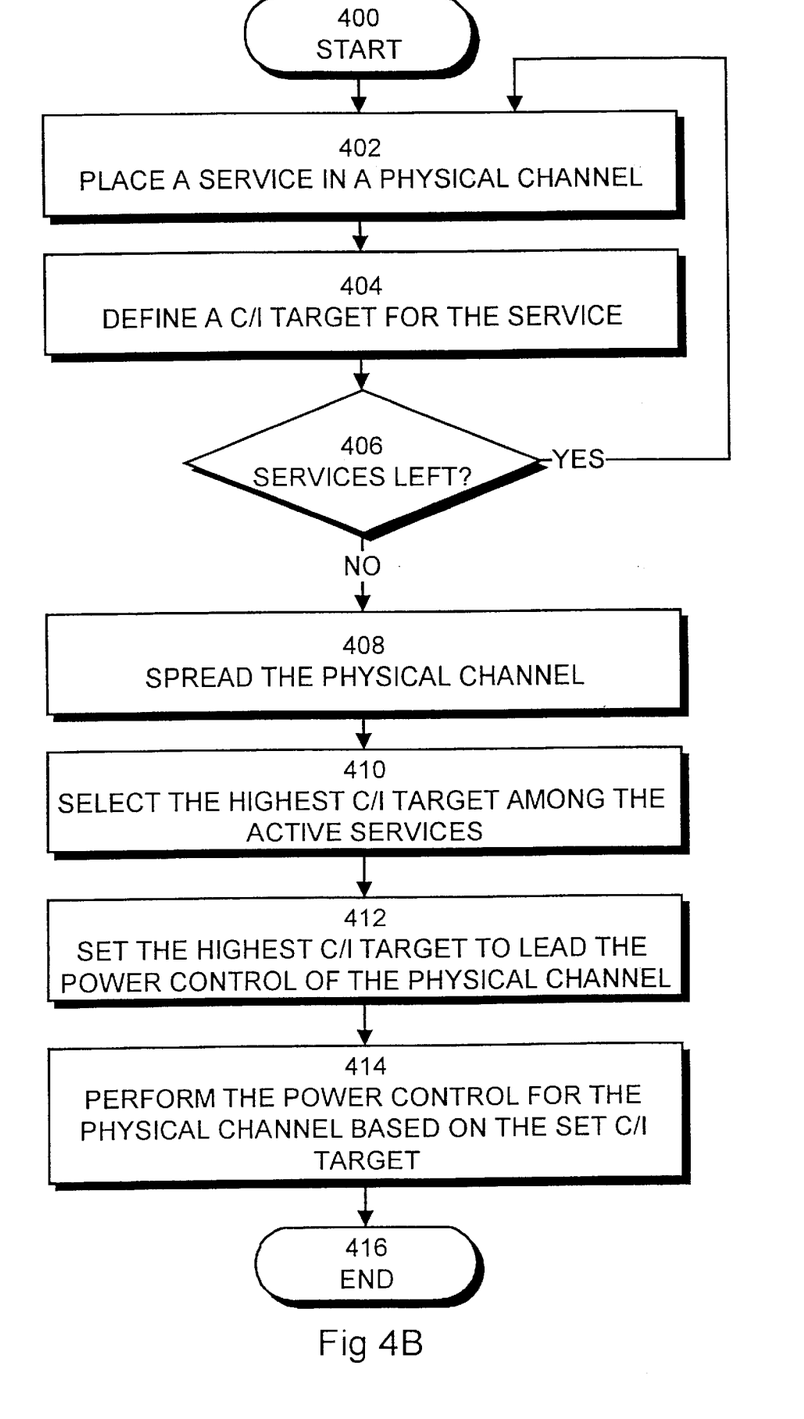

The selection method can be carried out in various ways. In a first embodiment the service having the highest carrier/interference target is selected from among the active services placed in the physical channel. In a second embodiment the service having the highest bit rate is selected from among the active services placed in the physical channel. In a third embodiment a real-time service is selected from among the active services placed in the physical channel. If there are several real-time services, selection from among them is made either according to the first or the second embodiment, i.e. either the service having the highest carrier/interference target or the service having the highest bit rate is selected. FIG. 4B illustrates implementation of the first embodiment. The method starts in block 400. In block 402 one service is placed in a physical channel. The services are multiplexed and interleaved into a frame of 10 ms used in the physical channel.

In block 404 a separate carrier/interference target is defined for the service in question. The initial value is obtained e.g. so that the system information of the radio system include the default value for the carrier/interference target of each service. The default value may be based on history information, i.e. the radio system collects information on which carrier/interference target corresponds to which quality level required from the service. Default values can be proportioned between different services. Thus the default values may be absolute or proportional.

In block 406 it is checked whether there still are services to be placed in the same physical channel. If this is the case, we return to block 402, where the next service is placed in the physical channel. If there are no services left, we proceed to block 408, where a physical channel is established with at least one spreading code. Next the highest carrier/interference target among the active services placed in the physical channel is determined in block 410. Then in block 412 the highest carrier/interference target of the active services is set to lead physical channel power control. Finally, physical channel power control is performed according to the carrier/interference target set for the physical channel in block 414. The method is finished in block 416. Naturally, this embodiment also enables the feedback shown in FIG. 4A.

The invention is preferably implemented by software, and thus the invention requires software changes in different parts of the system. Naturally, distribution of the changes depends a lot on the way in which the equipment is implemented, but in the system described by the examples power control requires a control arrangement which performs physical channel power control according to the carrier/interference target set for the physical channel, selects one service from among the active services placed in the physical channel using a predetermined selection method, and sets the service selected from among the active services to lead physical channel power control. For example, in the first embodiment of the selection method the control arrangement defines a separate carrier/interference target for each service 200A to 200D, determines the highest carrier/interference target among the active services 200A to 200D placed in the physical channel and sets the highest 200A to 200D carrier/interference target of the active services to lead physical channel power control. The control arrangement is implemented so that the control units 214, 224 of both the radio transmitter and the radio receiver carry out internal controlling tasks by controlling their blocks chiefly on the basis of the information received from the control unit 124 of the base station controller 102, but also on the basis of the information received from the control unit 118 of the base station 100. Thus implementation of the method of the invention is divided between said parts 118, 124, 214, 224, depending on the responsibilities given to each block.

In a preferred embodiment the carrier/interference target of a service is updated when the carrier/interference target in question leads physical channel power control. This means that control does not need to be performed on other services because the highest target also satisfies their quality requirements. However, if the quality requirements are not fulfilled, the carrier/interference target of the service can be adjusted.

In one embodiment the carrier/interference target of the physical channel power control is changed into the carrier/interference target of the service which was placed next to the service leading current power control in the selection method if the service that has had the highest carrier/interference target up to this point is rendered to a discontinuous transmission state. For example, in a first embodiment of the selection method the carrier/interference target of the physical channel power control is changed into the service having the next highest carrier/interference target. In that case the transmission power can be reduced because the service requiring the highest quality is no longer active, and thus the interference level of the system decreases.

In an embodiment the carrier/interference target of at least one other service is changed towards the change of the carrier/interference target of the highest active service if the carrier/interference target of the highest active service changes. In other words, it is assumed that changes in the radio environment are not reflected only on one service but on all services, or on some of them. Naturally, this also depends on the effectiveness of the channel coding used. If the valid carrier/interference target decreases below another target, it is thought that the other target can also be reduced and thus transmission power control decreases faster. It depends on the conditions in the system whether power control should occur fast or with a certain delay. It is usually desirable that the transmission power decreases faster than it increases. However, the system has to be optimized so that the quality of service does not suffer at the expense of capacity increase of the system.

In an embodiment the carrier/interference target of a service is updated according to the measured quality of service. The quality of service can be measured e.g. on the basis of a block code, such as cyclic redundancy check. Another preferred method of measuring the quality is to employ soft bit decisions of the Viterbi decoder.

In an embodiment the carrier/interference target of the physical channel is controlled with a correction term. The correction term can be used e.g. for adjusting the carrier/interference target of the selected service to the system conditions.

The method can be employed in a radio system utilizing macrodiversity, provided that the special features required by the system are taken into account. Macrodiversity means that signals are transmitted to one subscriber terminal 150 via at least two different base stations, and/or received from one subscriber terminal 150 via at least two different base stations 100. The transmission powers of the base stations 100 should be controlled so that the subscriber terminal 150 can combine signals into a sufficiently good signal in the RAKE fingers 230. The transmission power of the subscriber terminal is also controlled so that a sufficiently good signal is received via one base station 100. A sufficiently good signal means that the carrier/interference target of the physical channel established by the signal is achieved.

The method of the invention is also advantageous if the physical channel is established using time division multiple access (TDMA) in addition to a spreading code or codes. In the TDMA/CDMA radio system, for example, code spreading is used in a TDMA burst, and thus a different service can be placed for each spreading code or spreading code group used. In that case the receiver does not need to receive a separate burst for each service, but one burst includes different services encoded with different spreading codes. According to the invention, the carrier/interference target of the highest active service leads power control.

Even though the invention has been described above with reference to the example according to the accompanying drawings, it is clear that the invention is not restricted thereto, but it may be modified in various ways within the inventive concept disclosed in the appended claims.

What is claimed is:

1. A method of performing physical channel power control in a radio system, the method comprising
   (458) establishing a physical channel using at least one spreading code;
   (452) placing at least one service in the physical channel;
   (464) performing physical channel power control according to a carrier/interference target set for the physical channel,
characterized by:
   (460) selecting one service from among the active services placed in the physical channel using a predetermined selection method;
   (462) setting the carrier/interference target of the one selected service to lead physical channel power control.

2. A method according to claim 1, characterized in that the selection method comprises:
   selecting the service having the highest carrier/interference target from among the active services placed in the physical channel.

3. A method according to claim 1, characterized in that the carrier/interference target of the service is updated when the carrier/interference target in question leads physical channel power control.

4. A method according to claim 1, characterized in that the carrier/interference target of the physical channel power control is changed into the carrier/interference target of the service which was placed next to the service leading current power control in the selection method, if the service that has led power control up to this point is rendered to a discontinuous transmission state.

5. A method according to claim 1, characterized in that the carrier/interference target of the service is updated according to the measured quality of service.

6. A method according to claim 5, characterized in that the quality of service is measured on the basis of a block code, such as a cyclic redundancy check.

7. A method according to claim 5, characterized in that the quality of service is measured on the basis of soft bit decisions of a Viterbi decoder.

8. A method according to claim 1, characterized in that the carrier/interference target of the physical channel is controlled with a correction term.

9. A method according to claim 1, characterized in that if the carrier/interference target of the highest active service changes, the carrier/interference target of at least one other service is also changed towards the change of the carrier/interference target of the highest active service.

10. A method according to claim 1, characterized in that the system information of the radio system includes the default value of the carrier/interference target of each service.

11. A method according to claim 10, characterized in that the default value is based on history information.

12. A method according to claim 10, characterized in that the default values are proportioned between different services.

13. A method according to claim 1, characterized in that the services are multiplexed and interleaved into a frame of ten milliseconds used in the physical channel.

14. A method according to claim 1, characterized in that the method is employed in a radio system utilizing macrodiversity.

15. A method according to claim 1, characterized in the selection method comprises:
   selecting the service having the highest bit rate from among the active services placed in the physical channel.

16. A method according to claim 1, characterized in that the selection method comprises:
   selecting a real-time service from among the active services placed in the physical channel.

17. A method according to claim 16, characterized in that if there are several real-time services, one real-time service is selected using a predetermined selection rule, which is one of the following:
   selecting the service having the highest bit rate from among the real-time services;
   selecting the service having the highest carrier/interference target from among the real-time services.

18. A radio system comprising:
   a spreader (208) for establishing a physical channel with at least one spreading code;
   a multiplexer (204) for placing at least one service (200A–200D) in the physical channel;
   a control arrangement (118, 124, 214, 234) for performing physical channel power control according to the carrier/interference target set for the physical channel,
characterized in that
   the control arrangement (118, 124, 214, 234) selects one service from among the active services (200A–200D) placed in the physical channel using a predetermined selection method;
   the control arrangement (118, 124, 214, 234) sets the carrier/interference target of the service selected from among the active services to lead physical channel power control.

19. A radio system according to claim 18, characterized in that it also comprises a control arrangement (118, 124, 214, 234) for determining a carrier/interference target of its own for the service (200A–200D) and, to implement the selection method, a control arrangement (118, 124, 214, 234) for selecting the service having the highest carrier/interference target from among the active services (200A–200D) placed in the physical channel.

20. A radio system according to claim 18, characterized in that in the control arrangement (118, 124, 214, 234) the carrier/interference target of the service is updated when the carrier/interference target in question leads physical channel power control.

21. A radio system according to claim 18, characterized in that in the control arrangement (118, 124, 214, 234) the carrier/interference target of the physical channel power control is changed into the carrier/interference target of the service which was placed next to the service leading current power control in the selection method, if the service that has controlled power control up to this point is rendered to a discontinuous transmission state.

22. A radio system according to claim 18, characterized in that in the control arrangement (118, 124, 214, 234) the carrier/interference target of the service is updated according to the measured quality of service.

23. A radio system according to claim 22, characterized in that the quality of service is measured in a channel decoder (222A–222D) on the basis of a block code, such as a cyclic redundancy check.

24. A radio system according to claim 22, characterized in that the quality of service is measured in the channel decoder (222A–222D) on the basis of soft bit decisions of a Viterbi decoder.

25. A radio system according to claim 18, characterized in that in the control arrangement (118, 124, 214, 234) the carrier/interference target of the physical channel is controlled with a correction term.

26. A radio system according to claim 18, characterized in that in the control arrangement (118, 124, 214, 234) the carrier/interference target of at least one other service is also changed towards the change of the carrier/interference target of the highest active service if the carrier/interference target of the highest active service changes.

27. A radio system according to claim 18, characterized in that the system information of the radio system includes a default value of the carrier/interference target of each service.

28. A radio system according to claim 27, characterized in that the default value is based on history information.

29. A radio system according to claim 27, characterized in that the default values are proportioned between different services.

30. A radio system according to claim 18, characterized in that the services are multiplexed with a multiplexer (204) and interleaved with an interleaver (206) into a frame of ten milliseconds used in the physical channel.

31. A radio system according to claim 18, characterized in that macrodiversity is used.

32. A radio system according to claim 18, characterized in that to implement the selection method it comprises a control arrangement (118, 124, 214, 234) for selecting the service having the highest bit rate from among the active services (200A–200D) placed in the physical channel.

33. A radio system according to claim 18, characterized in that to implement the selection method it comprises a control arrangement (118, 124, 214, 234) for selecting a real-time service from among the active services (200A–200D) placed in the physical channel.

34. A radio system according to claim 33, characterized in that if there are several real-time services, the control arrangement (118, 124, 214, 234) selects one real-time service according to a predetermined selection rule, which is one of the following:

selecting the service having the highest bit rate from among the real-time services:

selecting the service having the highest carrier/interference target from among the real-time services.

* * * * *